(12) United States Patent
Peach

(10) Patent No.: US 7,464,441 B2
(45) Date of Patent: Dec. 16, 2008

(54) APPARATUS FOR ASSISTING IN PUSHING A WHEELBARROW

(76) Inventor: Clifton Peach, 909 Angies Crossing, Tool, TX (US) 75143

(*) Notice: Subject to any disclaimer, the term of this patent is extended or adjusted under 35 U.S.C. 154(b) by 0 days.

(21) Appl. No.: 11/977,286

(22) Filed: Oct. 24, 2007

(65) Prior Publication Data

US 2008/0168625 A1 Jul. 17, 2008

Related U.S. Application Data

(60) Provisional application No. 60/884,898, filed on Jan. 15, 2007.

(51) Int. Cl.
*A45C 3/00* (2006.01)

(52) U.S. Cl. ................ 16/430; 16/900; 280/47.31; 280/47.315; 298/3

(58) Field of Classification Search ............ 16/430, 16/900, 421, 426, 110.1, 422; 280/47.31, 280/47.315, 653; 298/3; 301/7; D34/16
See application file for complete search history.

(56) References Cited

U.S. PATENT DOCUMENTS

| 3,173,705 | A | * | 3/1965 | Du Puy | ............... 280/47.31 |
| 3,404,427 | A | * | 10/1968 | Mack | ............... 16/427 |
| 4,951,956 | A | * | 8/1990 | Vittone | ............... 280/47.31 |
| 5,153,966 | A | | 10/1992 | Godwin | |
| 5,758,887 | A | | 6/1998 | Bobst | |
| 5,794,307 | A | * | 8/1998 | Overcash et al. | ............... 16/427 |
| 5,799,960 | A | * | 9/1998 | Davis, Sr. | ............... 280/47.31 |
| 5,810,375 | A | | 9/1998 | Hoffarth et al. | |
| 6,099,025 | A | * | 8/2000 | Rohrs | ............... 280/659 |
| 6,125,512 | A | * | 10/2000 | Weber | ............... 16/430 |
| 6,336,254 | B1 | * | 1/2002 | Graff et al. | ............... 16/422 |
| 6,550,104 | B2 | | 4/2003 | Cacciacarne | |
| 6,880,852 | B2 | * | 4/2005 | Lim | ............... 280/653 |
| 7,121,565 | B2 | | 10/2006 | Lulay | |
| 2005/0104334 | A1 | * | 5/2005 | Conaway et al. | ............... 280/653 |
| 2005/0134012 | A1 | * | 6/2005 | Kan | ............... 280/47.34 |

* cited by examiner

*Primary Examiner*—William L. Miller
(74) *Attorney, Agent, or Firm*—James Ray & Assoc.

(57) ABSTRACT

An apparatus that is engageable with a wheelbarrow for assisting a user in pushing such wheelbarrow. The apparatus comprises at least one mounting plate formed of a first predetermined material and having a first predetermined shape engageable with a predetermined portion of such wheelbarrow. A pivotally adjustable telescoping arm member is formed of a predetermined material and is engageable on a first end thereof with the at least one mounting plate. A sleeve member is engageable intermediate a first end and a second end thereof with a second end of the arm member. The sleeve member is formed as a unitary part of the arm member and is disposed at a predetermined angle thereof. An elongated rod member is rotatingly and adjustably engageable with an inner portion of the sleeve member and extends outwardly toward such user. A bicep cup member having a predetermined shape is engageable on a first side thereof with an end of the elongated rod member. The bicep cup member is engageable on a second side thereof with a users upper arm when pushing such wheelbarrow.

17 Claims, 2 Drawing Sheets

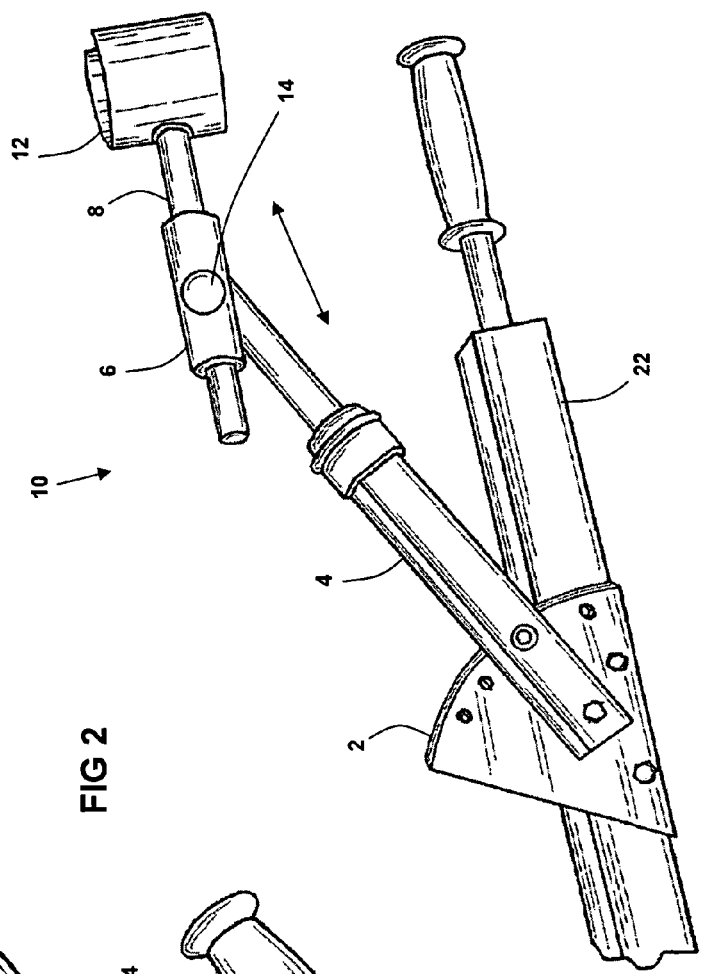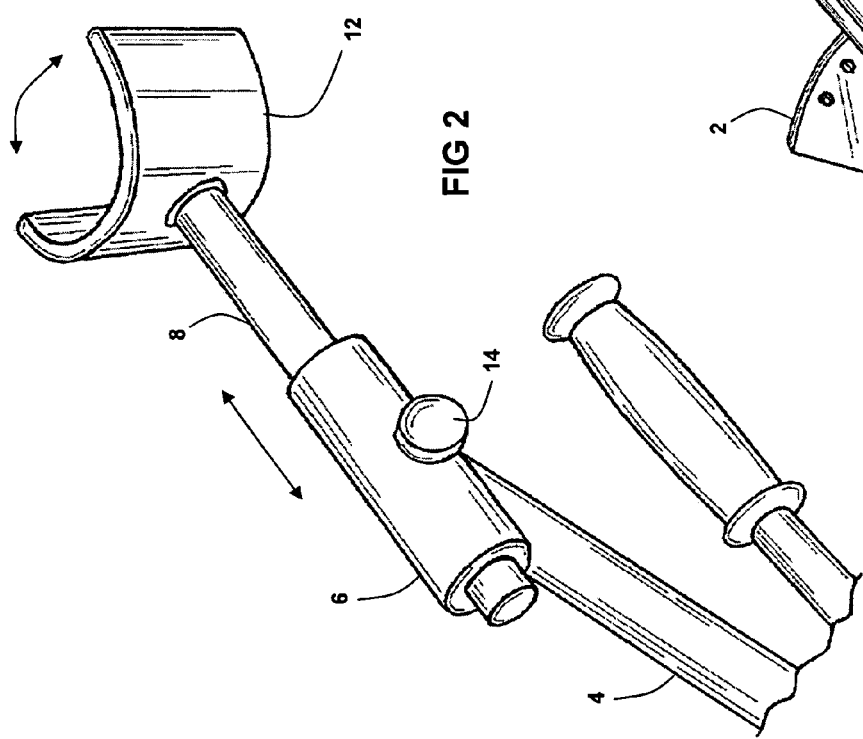

APPARATUS FOR ASSISTING IN PUSHING A WHEELBARROW

CROSS REFERENCE TO RELATED APPLICATIONS

This application is closely related to and claims benefit from U.S. Provisional Application Ser. No. 60/884,898 filed Jan. 15, 2007.

FIELD OF THE INVENTION

The present invention relates, in general, to a wheelbarrow, and, more particularly, the present invention relates to an apparatus that engages a wheelbarrow to assist a user in pushing a loaded wheelbarrow.

BACKGROUND OF THE INVENTION

Gardeners, landscapers, maintenance workers and others who commonly use a wheelbarrow often note stress and strain as a result of hauling heavy loads. A great deal of energy and strength is needed to push a wheelbarrow using the standard handles and limitations in movement can reduce the effectiveness and productivity of the user. Using only the standard handles on a wheelbarrow requires great effort and arm strength if the wheelbarrow is fully loaded.

Thus, it would be advantageous if there were a means for pushing a wheelbarrow that would allow the user to exert less stress by using the strength of the upper arms to help push the wheelbarrow. The present invention provides an apparatus that has arms engageable with a persons arms that encourages the use of the upper arms in pushing for an increase in strength.

SUMMARY OF THE INVENTION

In a first aspect the present invention provides an apparatus engageable with a wheelbarrow for assisting a user in pushing such wheelbarrow. The apparatus comprises at least one mounting plate formed of a first predetermined material and having a first predetermined shape engageable with a predetermined portion of such wheelbarrow. A pivotally adjustable telescoping arm member is formed of a predetermined material and is engageable on a first end thereof with the at least one mounting plate. A sleeve member is engageable intermediate a first end and a second end thereof with a second end of the pivotally adjustable telescoping arm member. The sleeve member is formed as a unitary part of the pivotally adjustable telescoping arm member and is disposed at a predetermined angle thereof. An elongated rod member is rotatingly and adjustably engageable with an inner portion of the sleeve member and extends outwardly toward such user. A bicep cup member has a predetermined shape and is engageable on a first side thereof with an end of the elongated rod member. The bicep cup member is engageable on a second side thereof with a users upper arm when pushing such wheelbarrow.

OBJECTS OF THE INVENTION

It is, therefore, one of the primary objects of the present invention to provide an aid to pushing a wheelbarrow.

Another object of the present invention is to provide an aid for pushing a wheelbarrow that is easily attachable to a wheelbarrow.

Still another object of the present invention is to provide an aid for pushing a wheelbarrow which encourages the use of the upper arms.

Yet another object of the present invention is to provide an aid for pushing a wheelbarrow which utilizes adjustable arms.

In addition to the various objects and advantages of the invention which have been described in some specific detail above it should be noted that various other objects and advantages of the present invention will become more readily apparent to those persons who are skilled in the relevant art from the following more detailed description, particularly when such description is taken in conjunction with the appended claims.

BRIEF DESCRIPTION OF THE DRAWINGS

FIG. 1 is a perspective view of the apparatus attached to the handle of a wheelbarrow according to an embodiment of the invention.

FIG. 2 is a is an enlarged perspective view of the sleeve member and the bicep cup that were shown in FIG. 1.

Figure 3:
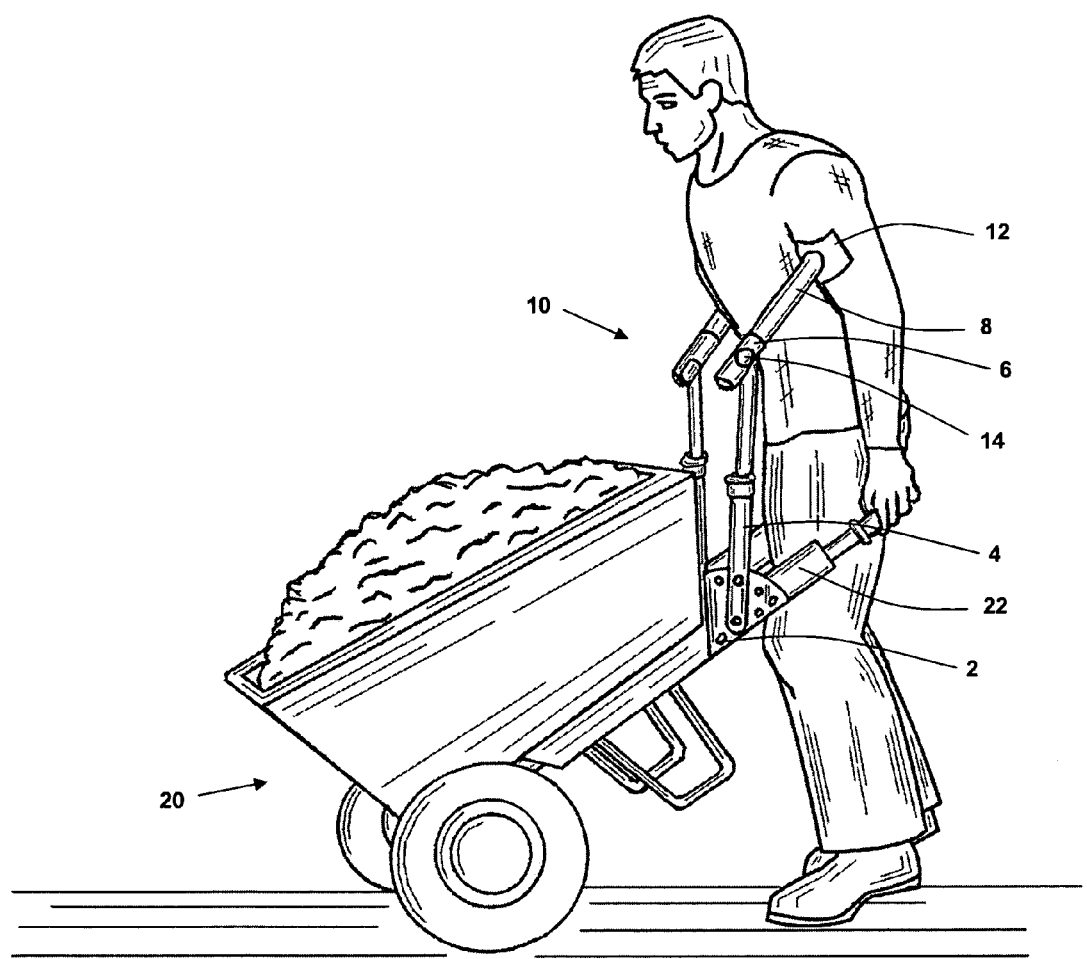
FIG. 3 is a perspective view of the apparatus shown in FIG. 1 as attached to a wheelbarrow and engageable with a user in pushing such wheelbarrow.

BRIEF DESCRIPTION OF THE PRESENTLY PREFERRED AND VARIOUS ALTERNATIVE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

In a first aspect the present invention provides an apparatus, generally designated 10, that is engageable with a wheelbarrow 20 for assisting a user in pushing such wheelbarrow 20. The apparatus comprises at least one mounting plate 2 formed of a first predetermined material and having a first predetermined shape engageable with a predetermined portion of such wheelbarrow 20. A pivotally adjustable telescoping arm member 4 is formed of a predetermined material and is engageable on a first end thereof with the at least one mounting plate 2. A sleeve member 6 is engageable intermediate a first end and a second end thereof with a second end of the pivotally adjustable telescoping arm member 4. The sleeve member 6 is formed as a unitary part of the pivotally adjustable telescoping arm member 4 and is disposed at a predetermined angle thereof. An elongated rod member 8 is rotatingly and adjustably engageable with an inner portion of the sleeve member 6 and extends outwardly toward such user. A bicep cup member 12 has a predetermined shape and is engageable on a first side thereof with an end of the elongated rod member 8. The bicep cup member 12 is engageable on a second side thereof with a users upper arm when pushing such wheelbarrow 20. It is presently preferred that such sleeve member 6 be formed as a unitary part of the telescoping arm member 4 and fixed at a predetermined angle.

As is clearly seen if FIGS. 1-3 such predetermined shape of the bicep cup 12 is arcuate so as to conform to the upper arm portion such user when pushing such wheelbarrow. The elongated rod member 8 being rotatingly and adjustably engageable with the sleeve member 6 permits the bicep cup 12 to be adjusted so that it forms a comfortable engagement with such users arm. Such elongated rod member 8 can be rotated so that the bicep cup member 12 engages the user's arm comfortably. The elongated rod member 8 is also adjustable as the length that it extends outward from the sleeve member 8 so that it meets the user's upper arm at a desired position. Such elongated rod member 8 is secured to the inner portion of the sleeve member 8 by means of a locking nut 14. Such locking nut 14 is tightened against the elongated rod member 8 to hold it in place.

It is presently preferred that such at least one mounting plate 2 is engaged to the wheelbarrow 20 by means of nuts and bolts. It is also preferred that the predetermined portion of the wheelbarrow 20 to which the mounting plate is engaged with is the handle portion 22 of the wheelbarrow 20. It is also preferred that such telescoping arm member 4 be secured to the mounting plate 2 by means of nuts and bolts.

It is also preferred that the first predetermined shape of the at least one mounting plate 2 is pie shaped as is seen in FIGS. 1 and 3. The pie shape is preferred because it can form a secure attachment to the wheelbarrow 20 and further the pie shape permits the telescoping arm member 4 to be adjusted to different angles, The arcuate portion of the pie shape has a plurality of apertures disposed thereon so that the angle is easily adjustable.

It is preferred that such first predetermined material and such second predetermined material be selected from one of a heavy plastic material and metal. If metal is used it is preferred that such metal is aluminum, since aluminum is light in weight and also posses the strength required for this type of use. It is preferred that both the mounting plate 2 and the telescoping arm member 4 be made of similar materials for compatibility. If plastic is used the plastic material must be heavy and strong enough for this operation.

Thus the present invention provides an efficient means for pushing a wheelbarrow. The apparatus encourages the use of the upper arms for an increase in strength. The apparatus is easily attached to or near the existing handle of the wheelbarrow and can easily be adjusted by any user. The user simply attaches a mounting plate to the desired area of the wheelbarrow and fastens the arms in place using nuts and bolts. The telescoping arm extend toward the user with a sleeve portion at the end of the telescoping arm. A bicep cup member attached to an elongated rod member that is engageable with the sleeve member is rotatingly adjustable and also adjustable to a desired length by lengthening or shortening the rod so that the bicep cups will rest against the user's upper arms. A locking nut secures the elongated rod when the correct position is achieved. The apparatus can be adjusted so that the bicep cups can engage the arm either near the upper arm or even up close to the shoulder in an almost upright position. The arrangement would depend on what the user is comfortable with and may also be dependent on the weight of the load in the wheelbarrow.

The apparatus can be made of various materials such as heavy plastic or metal. If metal is used it is preferred that such metal is aluminum. The apparatus can be made and applied during wheelbarrow production or as an after market design and can be made in various colors to match the wheelbarrow color.

While a presently preferred embodiment and alternate embodiments of the present invention have been described in detail above, it should be understood that various other adaptations and/or modifications of the invention can be made by those persons who are particularly skilled in the art without departing from either the spirit of the invention or the scope of the appended claims.

I claim:

1. An apparatus engageable with a wheelbarrow for assisting a user in pushing said wheelbarrow, said apparatus comprising:
    (a) at least one mounting plate formed of a first predetermined material and having a first predetermined shape engaged with a predetermined portion of said wheelbarrow;
    (b) a telescoping arm member being pivotably engaged on a first end thereof with said at least one mounting plate such that said telescoping arm member is pivotably adjustable relative to said at least one mounting plate;
    (c) a sleeve member engaged intermediate a first end and a second end thereof with a second end of said telescoping arm member, said sleeve member formed as a part of said telescoping arm member and disposed at a predetermined angle thereof;
    (d) an elongated rod member rotatingly and adjustably engaged with an inner portion of said sleeve member and extending outward therefrom; and
    (e) a bicep cup member having a second predetermined shape and engaged on a first side thereof with an end of said elongated rod member, said bicep cup member engageable on a second side thereof with a users upper arm when pushing said wheelbarrow.

2. The apparatus, according to claim 1, wherein said second predetermined shape of said bicep cup is arcuate and configured to conform to said upper arm of said user pushing said wheelbarrow.

3. The apparatus, according to claim 2, wherein said elongated rod member being rotatingly and adjustably engaged with said sleeve member permits said bicep cup to be adjusted so that it is configured to form a comfortable engagement with said users arm.

4. The apparatus, according to claim 1, wherein said at least one mounting plate is engaged to said wheelbarrow by means of nuts and bolts.

5. The apparatus, according to claim 1, wherein said predetermined portion of said wheelbarrow is a handle member of said wheelbarrow.

6. The apparatus, according to claim 1, wherein said elongated rod member is secured to said inner portion of said sleeve member by means of a locking nut.

7. The apparatus, according to claim 1, wherein said first predetermined shape of said at least one mounting plate is pie shaped.

8. The apparatus, according to claim 7, wherein said mounting plate with said pie shape has a plurality of apertures disposed on an arcuate portion of said mounting plate.

9. The apparatus, according to claim 8, wherein said apertures are used for adjusting an angle at which said telescoping arm member is engaged with said mounting plate.

10. The apparatus, according to claim 1, wherein said first predetermined material is selected from one of plastic and metal.

11. The apparatus, according to claim 10, wherein said first predetermined material is metal.

12. The apparatus, according to claim 11, wherein said metal is aluminum.

13. The apparatus, according to claim 1, wherein said telescoping arm member is secured to said mounting plate by means of nuts and bolts.

14. The apparatus, according to claim 1, wherein said second predetermined material is selected from one of plastic and metal.

15. The apparatus, according to claim 14, wherein said second predetermined material is metal.

16. The apparatus, according to claim 15, wherein said metal is aluminum.

17. The apparatus, according to claim 1, wherein said sleeve member is formed as a unitary part of said telescoping arm member.

* * * * *